(12) United States Patent
Barnes et al.

(10) Patent No.: US 11,032,104 B2
(45) Date of Patent: *Jun. 8, 2021

(54) UDP OVER TCP TUNNEL

(71) Applicant: LiveQoS Inc., Ottawa (CA)

(72) Inventors: Shane Daniel Barnes, Richmond (CA); Matthew Robert Williams, Kanata (CA); Miika Anttoni Klemetti, Kanata (CA); Vijayendran Mahendran, Kanata (CA); Uri Nebogatov, Kanata (CA); Mohan Krishna Vemulapali, Nepean (CA)

(73) Assignee: Adaptiv Networks Inc., Gatineau (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/123,436

(22) Filed: Sep. 6, 2018

(65) Prior Publication Data

US 2019/0007235 A1    Jan. 3, 2019

Related U.S. Application Data

(63) Continuation of application No. 14/460,526, filed on Aug. 15, 2014, now Pat. No. 10,097,373.

(51) Int. Cl.
*H04L 12/46* (2006.01)
*H04L 29/06* (2006.01)
(Continued)

(52) U.S. Cl.
CPC ............ *H04L 12/4633* (2013.01); *H04L 1/16* (2013.01); *H04L 47/193* (2013.01);
(Continued)

(58) Field of Classification Search
None
See application file for complete search history.

(56) References Cited

U.S. PATENT DOCUMENTS

2003/0188001 A1   10/2003  Eisenberg
2005/0080919 A1*  4/2005   Li .................. H04L 69/161
                                                          709/236
(Continued)

FOREIGN PATENT DOCUMENTS

CN           101945266 B       6/2012

*Primary Examiner* — Christine T Duong
(74) *Attorney, Agent, or Firm* — Stratford Managers Corporation

(57) ABSTRACT

A system transports a plurality of UDP datagrams from a sending application to a receiving application by creating a TCP tunnel between a TCP sending-end and a TCP receiving-end, encapsulating the datagrams in TCP packets at the TCP transmitting-end, transmitting the TCP packets via the TCP tunnel to the TCP receiving-end over a network using a TCP/IP protocol, and extracting the datagrams from the TCP packet and forwarding the extracted datagrams to the receiving application. The TCP tunnel may provide the same delay and responsiveness as UDP protocol. The TCP receiving-end may detect when a packet is missing and request retransmission when a packet is missing, so that the TCP sending-end retransmits the missing packets. The transmitting of TCP packets to the TCP receiving-end continues when the receiving-end detects a missing packet, so that there is no lag in the forwarding of the extracted datagrams. Retransmitted packets may be discarded.

4 Claims, 2 Drawing Sheets

(51) Int. Cl.
*H04L 12/801* (2013.01)
*H04L 1/16* (2006.01)
*H04L 1/18* (2006.01)

(52) U.S. Cl.
CPC .......... *H04L 47/196* (2013.01); *H04L 69/161* (2013.01); *H04L 1/1835* (2013.01); *H04L 69/163* (2013.01); *H04L 69/164* (2013.01)

(56) References Cited

U.S. PATENT DOCUMENTS

| | | | |
|---|---|---|---|
| 2005/0099959 A1 | 5/2005 | Standridge | |
| 2009/0158418 A1* | 6/2009 | Rao | H04L 63/0272 726/12 |
| 2012/0005369 A1* | 1/2012 | Capone | H04L 29/06 709/236 |

* cited by examiner

UDP OVER TCP TUNNEL

CROSS-REFERENCE TO RELATED APPLICATIONS

This application is a continuation of and claims priority to U.S. patent application Ser. No. 14/460,526, filed Aug. 15, 2014, now allowed, which is hereby incorporated by reference herein in its entirety.

FIELD OF THE INVENTION

The present disclosure relates to communication networks using User Datagram Protocol (UDP).

BRIEF SUMMARY

In accordance with one embodiment, a system is provided for transporting a plurality of UDP datagrams from a sending application to a receiving application over a network. The system creates a TCP tunnel between a TCP sending-end and a TCP receiving-end, encapsulates the datagrams in TCP packets at the TCP transmitting-end, transmits the TCP packets via the TCP tunnel to the TCP receiving-end over the network using a TCP/IP protocol, and extracts the datagrams from the TCP packet and forwards the extracted datagrams to the receiving application. In one implementation, the TCP tunnel provides the same delay and responsiveness as UDP protocol. The TCP receiving-end may detect when a packet is missing and request retransmission when a packet is missing, so that the TCP sending-end retransmits the missing packets. The transmitting of TCP packets to the TCP receiving-end continues when the receiving-end detects a missing packet, so that there is no lag in the forwarding of the extracted datagrams. The retransmitted packets are preferably discarded at the TCP receiving-end.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
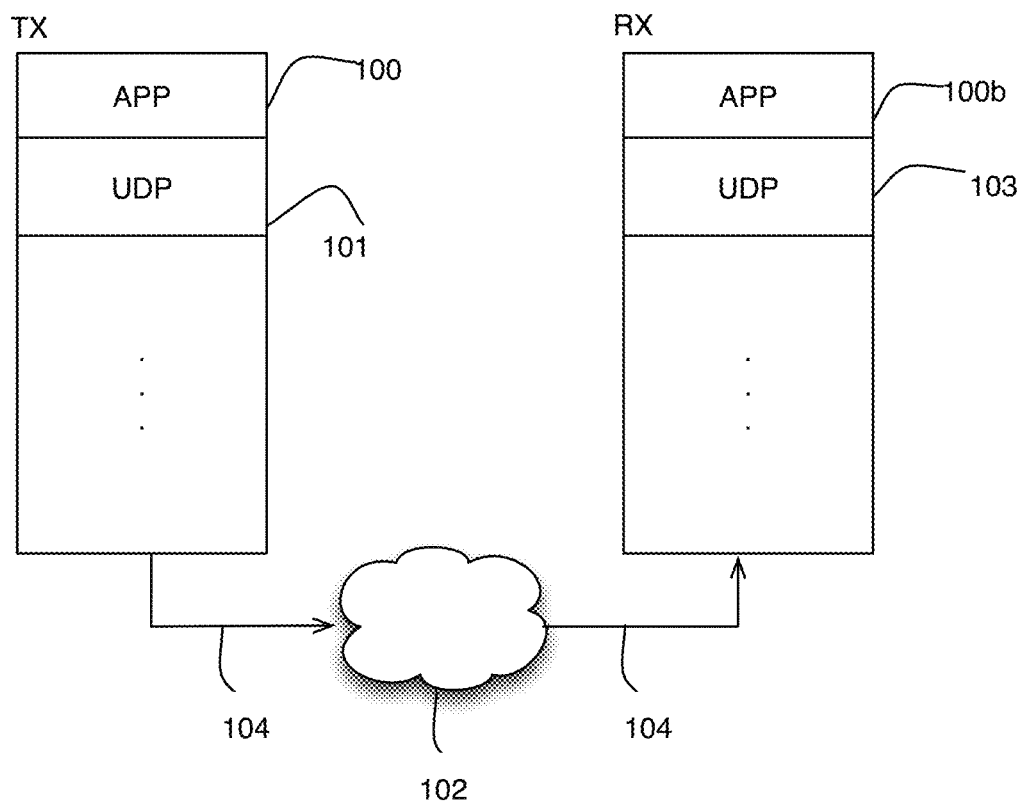
FIG. 1 is a diagrammatic illustration of a UDP transmission.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

FIG. 1 illustrates a UDP transmission from a transmitting application 100a to a receiving application 100b via a network 102. UDP is one of the core members of the internet protocol suite (the set of network protocols used for the Internet). With UDP, computer applications such as 100 can send messages, in this case referred to as datagrams, to other hosts 100b on an Internet Protocol (IP) network 102 without prior communications to set up special transmission channels or data paths.

UDP uses a simple transmission model 104 with a minimum of protocol mechanisms. It has no handshaking dialogues, and thus exposes any unreliability of the underlying network protocol to the receiving application 100b. As this is normally IP over unreliable media, there is no guarantee of delivery, ordering, or duplicate protection. UDP provides checksums for data integrity, and port numbers for addressing different functions at the source and destination of the datagram.

UDP is suitable for purposes where error checking and correction is either not necessary or is performed in the application, avoiding the overhead of such processing at the transport interface level. Time-sensitive applications often use UDP because dropping packets is preferable to waiting for delayed packets, which may not be an option in a real-time system.

Due to its uncontrolled characteristics, network/service providers may not allow UDP transmission over their networks as it can create congestion and UDP connections are difficult to manage.

Network/service providers prefer that applications use the Transmission Control Protocol (TCP), which is another one of the core protocols of the Internet Protocol suite (IP). TCP provides controlled, reliable, ordered and error-checked delivery of packets between programs or applications running on computers connected to a network. However TCP can lead to lags during loss events, which is not good for real time applications. On the receive side of a TCP connection, the packets are not delivered to the application when a packet is missing. Retransmissions are requested to the transmit side of the TCP connection. Delivery of the packets is continued when the missing packets are received at the receive side of the TCP connection. On the transmit side of the TCP connection, the transmission rate slows down when a retransmission request is received, to avoid creating further congestion in the network. The missing packets are retransmitted, and the retransmission rate slowly increases when no retransmission requests are received. The TCP transmission rate is therefore controlled to avoid contributing to congestion in the network.

There is a need to make UDP transmission behave like a TCP transmission from the network perspective without generating the lag experienced during loss events.

Figure 2:
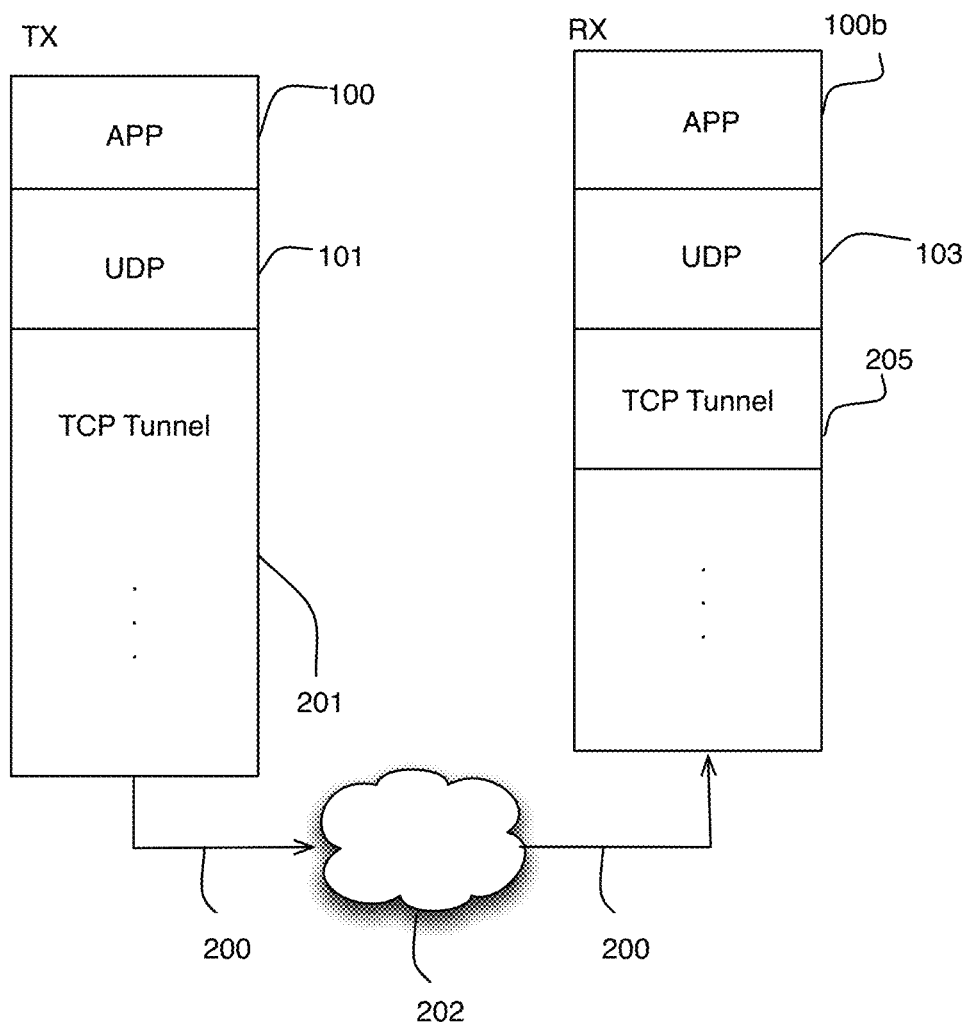
FIG. 2 is a diagrammatic illustration of a UDP transmission over a TCP tunnel.

FIG. 2 illustrates an example of a uni-directional application 100a using a UDP protocol 101 to transmit packets to a receiving application 100b via a UDP protocol 103. In this case a TCP tunnel 200 is created to encapsulate the UDP datagrams into TCP packets and to use the TCP/IP protocol to transmit the datagrams over a network 202. The TCP tunnel 200 includes a sending-end (TX side) 201 and a receiving-end (RX side) 205. The TCP tunnel 200 behaves like a traditional TCP/IP connection over the network 202, but is designed to provide the same delay and responsiveness as the traditional UDP protocol. As such, the RX side 205 detects when a packet is missing and requests retransmissions of the missing packets. The TX side 201 performs the required slow down, using any compliant slow-down mechanisms, and the TX side 201 resends the missing packets.

However, unlike the traditional TCP connections, the RX side 205 does not stop delivering packets when one is deemed missing. Packet delivery to the application 100b continues even if packets are lost. There is no longer a guaranteed ordering, but there is no lag in the delivery of packets to the destination. Furthermore, the RX side 205 keeps track of the packets that are resent by the TX side 201 and discards them without sending them to the application 100b. This way the application 100b does not receive any duplicates, which is what a UDP-based application would expect. UDP-based applications are designed to handle loss but may not be designed to handle the large amount of out-of-order delivery that would occur if the retransmitted packet(s) were delivered.

If the application 100 sends UDP datagrams at a fixed or uncontrolled transmission rate which exceeds the capacity of the underlying network 202, then the end-to-end real time performance from the sending application 100 to the receiving application 100b may be significantly degraded by dropped packets. A packet shaper located at the TX side 201 can be configured to enforce traffic policies which will limit the effective transmission rate of the application 100 in the event where the maximum transmission rate of the TCP tunnel 200 will not support the uncontrolled transmission rate of the application 100 while attempting to maximize real time performance in the presence of unavoidable packet loss.

A packet optimizer located at the TX side 201 ensures that the transmission efficiency of UDP datagrams originating from the application 100 is maximized for the TCP tunnel 200 encapsulation.

A packet delivery scheduler located at the RX side 205 can be configured to intelligently forward packets to the application 100b based on the conditions of the network 202 without compromising the real time requirements of the application 100b. Scheduler delivery methods include reliable (lossless) delivery of ordered packets, reliable (lossless) delivery of unordered packets, and unreliable (lossy) delivery of ordered packets.

By using the UDP-friendly TCP tunnel 200, the network 202 observes a standard TCP connection with all its advantages from a network perspective, and the application observes the performance advantages of a UDP connection.

As an example, assume that the UDP layer transmits packets A, B and C to the UDP receiver 103 via the network 202. Packet B is lost due to congestion or error. Packets A and C reach the TCP tunnel RX side 205, which delivers packets A and C to the UDP receiver layer 103 without any delay, but notifies the TCP TX side 201 of the loss as per the normal TCP protocol, so that the TX side can perform the required back off and, as per the standard, re-send the missing packet B. When the TCP RX side 205 receives packet B, however, it discards packet B without delivering it to the UDP receiver layer 103, which is not expecting packet B because normal UDP protocol does not perform retransmissions of lost packets.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method of transporting a plurality of UDP datagrams transmitted with a UDP protocol from a sending application to a receiving application over a network, said method comprising:
    creating, by the sending application, a TCP tunnel between the sending application and the receiving application;
    encapsulating, by the sending application, one of said UDP datagrams in one of said TCP packet;
    transmitting, by the sending application, said TCP packets via said TCP tunnel to said receiving application over said network using a TCP/IP protocol;
    extracting, by the receiving application, said UDP datagram from said TCP packet and forwarding the extracted said UDP datagram to the receiving application;
    maximizing real time performance, by the sending application, of a transmission rate of said TCP packets in response to detection of none or more missing TCP packets; and
    detecting and deleting, by the receiving application, retransmitted UDP datagrams.

2. The method of claim 1 in which said TCP tunnel provides a comparable delay and responsiveness as said UDP protocol.

3. A system for transporting a plurality of UDP datagrams from a sending application to a receiving application over a network, said system comprising:
- a TCP sending-end that encapsulates a UDP datagram to be transmitted in a TCP packet over a TCP tunnel using a TCP protocol;
- a TCP receiving-end that extracts the UDP datagram from said TCP packets and forwards the extracted said UDP datagrams to the receiving application;
- wherein said TCP receiving-end detects when a TCP packet is missing and requests retransmissions of a missing TCP packet while continuing to send the extracted UDP datagrams to the receiving application; and
- maximizing real time performance, by the TCP sending-end, of a transmission rate of said TCP packets in response to detection of none or more missing TCP packets;
- wherein said TCP sending-end retransmits the missing packet while the TCP receiving-end discards the retransmitted missing UDP datagrams.

4. The system of claim 3 in which said TCP tunnel provides a comparable delay and responsiveness as a UDP protocol.

* * * * *